(12) United States Patent
Kang et al.

(10) Patent No.: US 10,904,043 B2
(45) Date of Patent: Jan. 26, 2021

(54) OPTICAL TRANSMISSION APPARATUS AND METHOD FOR PROCESSING SIGNAL BASED ON DIRECT DETECTION

(71) Applicant: ELECTRONICS AND TELECOMMUNICATIONS RESEARCH INSTITUTE, Daejeon (KR)

(72) Inventors: Hun Sik Kang, Daejeon (KR); Sang Rok Moon, Daejeon (KR); Seung Woo Lee, Daejeon (KR); In Ki Hwang, Daejeon (KR); Sun Hyok Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/931,821

(22) Filed: May 14, 2020

(65) Prior Publication Data

US 2020/0366536 A1  Nov. 19, 2020

(30) Foreign Application Priority Data

May 17, 2019 (KR) .................. 10-2019-0058124

(51) Int. Cl.
*H04L 25/03* (2006.01)
*H04L 1/00* (2006.01)
(Continued)

(52) U.S. Cl.
CPC ...... *H04L 25/03299* (2013.01); *H04L 1/0009* (2013.01); *H04L 1/0025* (2013.01);
(Continued)

(58) Field of Classification Search
CPC .............. H04L 1/0054; H04L 1/0009; H04L 2025/0377; H04L 2025/03815;
(Continued)

(56) References Cited

U.S. PATENT DOCUMENTS

2002/0136334 A1  9/2002  Nagayasu
2006/0013590 A1*  1/2006  Hueda .................... H04B 10/60
                                                     398/149
(Continued)

FOREIGN PATENT DOCUMENTS

JP        2002-043990 A        2/2002

OTHER PUBLICATIONS

Hongtao Zhang et al. ,"PAM4 Signaling for 56G Serial Link Applications", UBM, DesignCon, 2016.
(Continued)

*Primary Examiner* — Sung S Ahn
(74) *Attorney, Agent, or Firm* — LRK Patent Law Firm (57) ABSTRACT

An optical transmission method for processing a signal based on direct detection includes setting, by an equalizer, an adaptive equalization coefficient by performing an equalization process during a training symbol field section in a frame of a received signal, performing, by a channel estimator, channel estimation to perform an equalization process of a soft output maximum likelihood sequence equalizer (MLSE) during the training symbol field section, driving the soft output MLSE, and compensating for, by the soft output MLSE, distortion of the received signal during a data symbol field section in the frame on the basis of the adaptive equalization coefficient and an estimated result value of a channel, and recovering, by an error corrector which allows soft-decision processing to be performed, the received signal by performing error correction on the received signal in which the distortion is compensated for.

20 Claims, 9 Drawing Sheets

(51) Int. Cl.
*H04L 25/02* (2006.01)
*H04L 1/20* (2006.01)

(52) U.S. Cl.
CPC ............. *H04L 1/0071* (2013.01); *H04L 1/20* (2013.01); *H04L 25/0212* (2013.01); *H04L 2025/0377* (2013.01); *H04L 2025/03815* (2013.01)

(58) Field of Classification Search
CPC ............ H04L 25/03299; H04L 1/0025; H04L 1/0071; H04L 1/20; H04L 25/0212
See application file for complete search history.

(56) References Cited

U.S. PATENT DOCUMENTS

| | | |
|---|---|---|
| 2007/0133672 A1 | 6/2007 | Lee et al. |
| 2011/0129010 A1 | 6/2011 | Yang |
| 2014/0325319 A1* | 10/2014 | Cai ...................... H04L 1/0054 714/774 |
| 2016/0142154 A1* | 5/2016 | Jia ...................... H04B 10/6165 398/27 |

OTHER PUBLICATIONS

Andrew C. Singer et al., "Electronic Dispersion Compensation: An overview of optical communications systems", IEEE Signal Processing Magazine, Nov. 2008.

* cited by examiner

OPTICAL TRANSMISSION APPARATUS AND METHOD FOR PROCESSING SIGNAL BASED ON DIRECT DETECTION

CROSS-REFERENCE TO RELATED APPLICATION

This application claims priority to and the benefit of Korean Patent Application No. 10-2019-0058124, filed on May 17, 2019, the disclosure of which is incorporated herein by reference in its entirety.

BACKGROUND

1. Field of the Invention

The present invention relates to an optical transmission apparatus and method for processing a signal based on direct detection.

2. Discussion of Related Art

In order to expand transmission distances in optical communication based on an intensity-modulation direct-detection (IM-DD) method, it is necessary to eliminate a signal distortion effect due to chromatic dispersion and the nonlinearity of a photodetector.

However, in the conventional transmission and reception method using a decision feedback equalizer (DFE) or a maximum likelihood sequence equalizer (MLSE), distortion is compensated for by utilizing a hard-decision signal of a received signal.

The compensation limits a gain in subsequent error correction so that there is a limitation in further expanding the transmission distance.

Therefore, in order to address the above problem, a transmission structure and method for expanding a transmission distance in optical communication using a method based on IM-DD is necessary.

SUMMARY OF THE INVENTION

The present invention is directed to providing an optical transmission apparatus and method for processing a signal based on direct detection, which allow an error propagation problem to be addressed and allow a transmission distance to be further expanded using a structure capable of soft-decision in a decision feedback equalizer (DFE) and a maximum likelihood sequence equalizer (MLSE), which are adaptive equalizers.

However, objects of the present invention are not limited to the above-described objects and other unmentioned effects may be present.

According to an aspect of the present invention, there is provided an optical transmission apparatus for processing a signal based on direct detection, which includes an equalizer configured to set an adaptive equalization coefficient by performing an equalization process during a training symbol field section of a received signal, a channel estimator configured to estimate a channel during the training symbol field section, a soft output MLSE configured to compensate for distortion of the received signal during a data symbol field section of the received signal on the basis of the adaptive equalization coefficient and an estimated result value of the channel, and a soft-decision error corrector configured to recover the received signal by performing error correction on the received signal in which the distortion is compensated for.

A frame of the received signal may include a frame marker field indicating a start of the received signal, a training symbol field, which is a section in which an adaptive equalizer is trained to compensate for a channel and nonlinear distortion of the received signal, and a data symbol field in which actual data transmission is performed.

The training symbol field may include a plurality of training symbol blocks, and the training symbol block may include a plurality of training sub-symbols obtained by mapping a pseudo random binary sequence (PRBS) or binary data of a random form to a four-level pulse-amplitude modulation (PAM-4) symbol.

The data symbol field may include a plurality of data symbol blocks, and the data symbol block may include a plurality of data sub-symbols and one block termination symbol.

The optical transmission apparatus may further include an analog-to-digital convertor (ADC) configured to quantize the received signal and a frame detector configured to detect a frame marker field of a signal passing through the ADC.

The frame detector may detect the frame marker field by performing cross-correlation on the received signal with a frame marker signal.

The optical transmission apparatus may further include a symbol timing interpolator configured to perform interpolation on the received signal on the basis of a received PAM-4 symbol estimated by a symbol timing recovery estimator.

The optical transmission apparatus may further include an adaptive equalization coefficient setter configured to approximate a covariance on the basis of regression vectors and training symbols of the interpolated signal and to calculate the adaptive equalization coefficient on the basis of the approximated covariance.

The regression vector of the interpolated signal may include M sample values of the interpolated signal.

The adaptive equalization coefficient may include an equalization coefficient of a feed-forward equalizer (FFE) and an equalization coefficient of a feed-back equalizer (FBE).

The adaptive equalization coefficient may be updated by the number of K regression vectors of the interpolated signal.

The K regression vectors and the K training symbols of the interpolated signal may be generated at each preset period.

The FFE may output a signal from which interference caused by a post-cursor of an optical transmission channel impulse response is eliminated on the basis of the adaptive equalization coefficient determined by the equalization process, the FBE may output a signal from which the interference caused by the post-cursor of the optical transmission channel impulse response is eliminated on the basis of the adaptive equalization coefficient determined by the equalization process, and the adaptive equalization coefficient setter may calculate an error signal using a difference signal between signals from which the interference is eliminated and using a difference between the difference signal and the training symbol and set the adaptive equalization coefficient by reflecting the error signal on the adaptive equalization coefficient.

The channel estimator may assume an equivalent optical transmission channel formed to have a channel length reflecting residual interference of the training symbol in the training symbol field, accumulate a histogram of the training symbol output through the equivalent optical transmission channel, and extract a mean value and a standard deviation from the accumulated histograms.

The soft output MLSE may calculate a branch metric using the extracted mean value and standard deviation to calculate a log-likelihood ratio for an input symbol and compensate for distortion.

The soft-decision error corrector may receive a signal passing through a de-interleaver for preventing a burst error and perform the error correction on the basis of the calculated log-likelihood ratio.

According to another aspect of the present invention, there is provided an optical transmission method for processing a signal based on direct detection, which includes setting, by an equalizer, an adaptive equalization coefficient by performing an equalization process during a training symbol field section in a frame of a received signal, performing, by a channel estimator, channel estimation to perform an equalization process of a soft output MLSE during the training symbol field section, driving the soft output MLSE, and compensating for, by the soft output MLSE, distortion of the received signal during a data symbol field section in the frame on the basis of the adaptive equalization coefficient and an estimated result value of a channel, and recovering, by an error corrector which allows soft-decision processing to be performed, the received signal by performing error correction on the received signal in which the distortion is compensated for.

The optical transmission method for processing a signal based on direct detection may further include quantizing the received signal by inputting the received signal to an ADC, detecting a frame marker field by passing a signal passing through the ADC through a frame detector, and performing, by a symbol timing interpolator, interpolation on the received signal on the basis of a received PAM-4 symbol estimated by a symbol timing recovery estimator. The detecting of the frame marker field by passing the signal passing through the ADC through the frame detector may include detecting the frame marker field by performing cross-correlation on the received signal with a frame marker signal.

The setting of the adaptive equalization coefficient by performing the equalization process during the training symbol field section in the frame of the received signal in the equalizer may include approximating a covariance on the basis of K regression vectors and K training symbols of the interpolated signal and calculating the adaptive equalization coefficient by applying the approximated covariance to an adaptive equalization coefficient setter. The adaptive equalization coefficient may include an equalization coefficient of an FFE and an equalization coefficient of an FBE.

The performing of the channel estimation in the channel estimator may include assuming an equivalent optical transmission channel formed to have a channel length reflecting residual interference of the training symbol in a training symbol field, accumulating a histogram of the training symbol output through the equivalent optical transmission channel, and extracting a mean value and a standard deviation from the accumulated histograms. The compensating for the distortion of the received signal may include calculating a branch metric using the extracted mean value and standard deviation to calculate a log-likelihood ratio for the input symbol, and compensating for distortion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments that are easily performed by those skilled in the art will be described in detail with reference to the accompanying drawings. However, the embodiments of the present invention may be implemented in several different forms and are not limited to embodiments described herein. In addition, parts irrelevant to description are omitted in the drawings in order to clearly explain the embodiments of the present invention.

Throughout this specification, when a certain part "includes" a certain component, it means that another component may be further included not excluding another component unless otherwise defined.

First, a related art of the present invention will be described with reference to FIGS. 1 to 3B.

Figure 1:
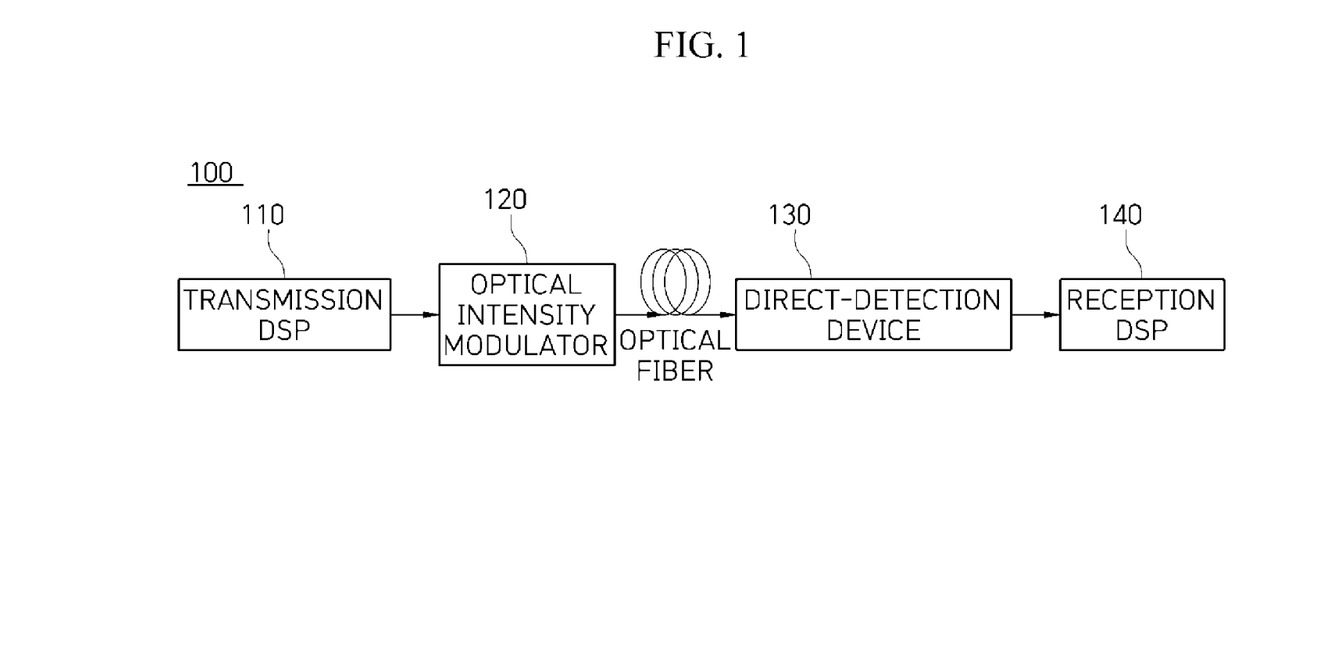
FIG. 1 is a diagram for describing an optical communication method based on intensity-modulation direct-detection (IM-DD)

FIG. 1 is a diagram for describing an optical communication method based on intensity-modulation direct-detection (IM-DD) (hereinafter, referred to as "direct detection").

In an optical communication apparatus 100 based on IM-DD according to FIG. 1, transmission information is generated by a transmission signal processing device 110 (i.e., a transmission digital signal processor (DSP)) and transmitted to an optical intensity modulator 120, and thus the optical communication apparatus 100 transmits the transmission information by adjusting the intensity of light according to a transmitted signal.

Then, a direct-detection device 130 including a photodetector such as a photodiode converts an optical signal of the transmission information into an electrical signal and transmits the converted electrical signal to a reception signal processing device 140 (i.e., a reception DSP) so that the transmission information is recovered.

The above method is widely used in short-distance optical communication due to the simplicity of a configuration and the cost competitiveness of parts.

Meanwhile, as the user data traffic increases, a requirement of transmission capacity in optical communication also increases. Accordingly, technologies for supporting data transmission rates of 50 G, 100 G, 200 G, and 400 G (G: Gb/s) are currently emerging.

Further, as the required data transmission rate in optical communication increases, the existing non-return-to-zero (NRZ) signals require a large bandwidth. In an apparatus based on IM-DD that requires a data transmission rate of 50 G, 100 G, 200 G, 400 G, or higher, the data transmission rate is increased using a four-level pulse-amplitude modulation (PAM-4) technique (in which a 2-bit signal may be transmitted per transmission symbol).

In a high-order modulation and demodulation method such as PAM-4, a signal occupies less signal bandwidth but requires a higher signal-to-noise ratio (SNR) than the existing NRZ signal. Therefore, there is a limitation in transmission distance. In this case, the transmission distance is limited by an inter-symbol-interference (ISI) phenomenon that adjacent information signals overlap each other in an optical fiber due to chromatic dispersion, in which a signal transmission rate varies depending on a frequency of the signal, and is limited by the nonlinearity of the direct-detection device.

Figure 2A:
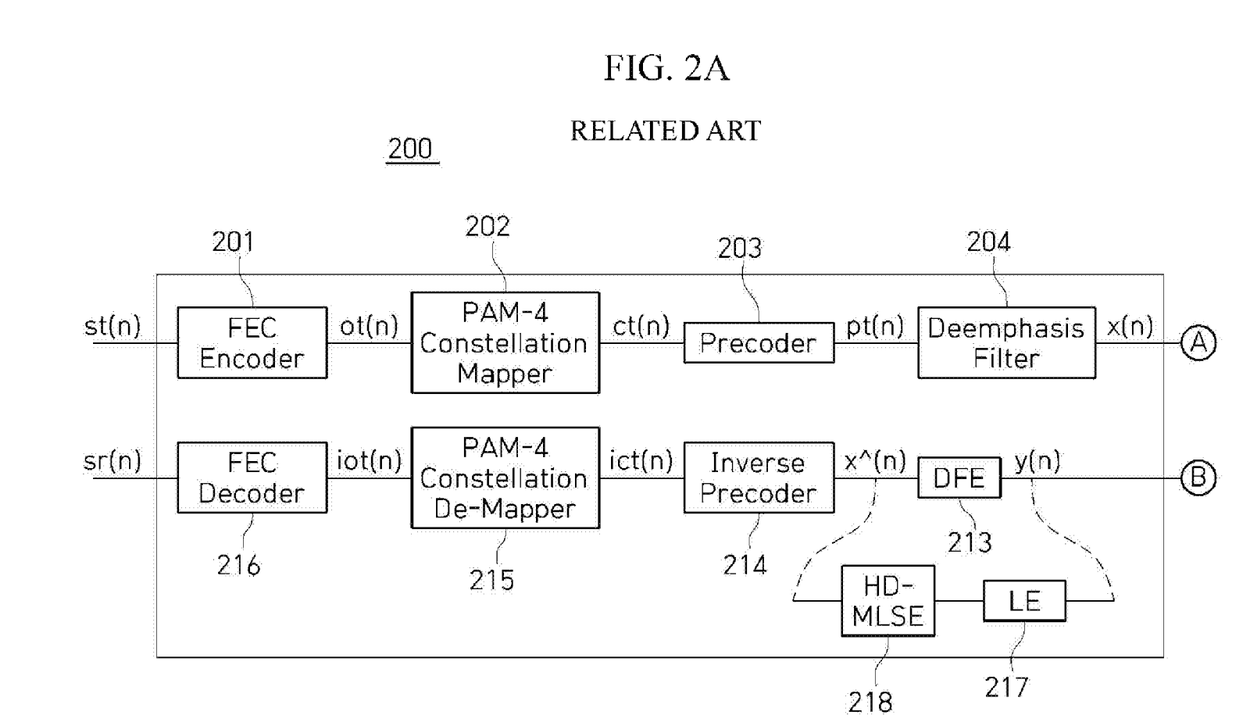
FIG. 2A and FIG. 2B is a diagram for describing a digital signal processing device according to a related art.
Figure 2B:
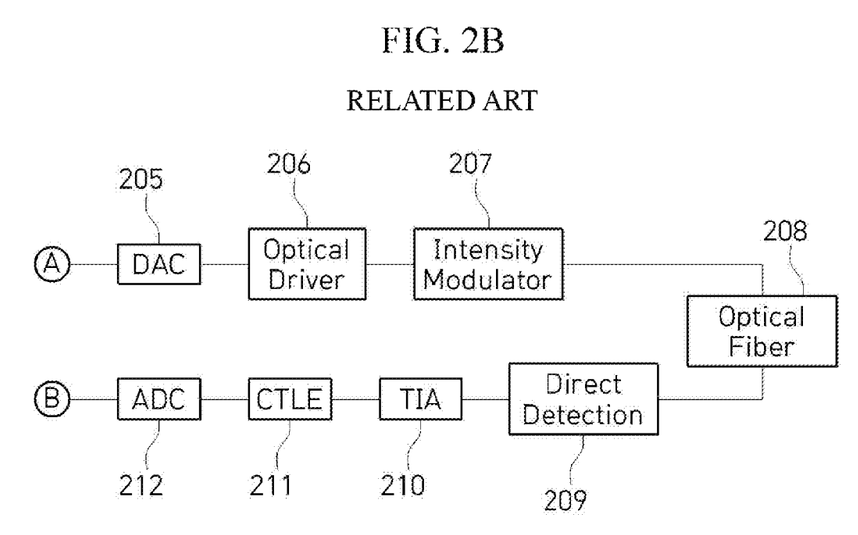

FIG. 2A and FIG. 2B is a diagram for describing a digital signal processing device 200 according to the related art.

In FIG. 2A and FIG. 2B, digital signal processing is used as a method that is currently widely used to address the above-described problem so that signal distortion due to chromatic dispersion and nonlinear response is compensated for.

Specifically, a signal st(n) to be transmitted (here, n denotes a time sequence) passes through a forward error correction (FEC) encoder 201 that provides overhead information for channel error correction (i.e., FEC). A signal ot(n) passing through the FEC encoder 201 passes through a PAM-4 constellation mapper 202 in order to generate a PAM-4 symbol so that a 2-bit signal is mapped to a single PAM-4 symbol ct(n). In this case, mapping information is shown in Table 1.

TABLE 1

| | |
|---|---|
| 00 | −3 |
| 01 | −1 |
| 11 | +1 |
| 10 | +3 |

The mapped PAM-4 symbol functions to allow a precoder 203 to prevent a burst error from occurring at a reception terminal.

An output signal pt(n) of the precoder 203 passes through a deemphasis filter 204 formed as a finite impulse response (FIR) filter for partially compensating for a response in a high frequency region of a transmission channel.

A signal x(n) passing through the deemphasis filter 204 passes through a digital-to-analog converter (DAC) 205, an optical driver 206, and an intensity modulator 207 that converts an electrical signal into an optical signal, and then passes through an optical fiber 208.

The signal passing through the optical fiber 208 passes through a direct-detection device 209, which is formed as a photodetector (such as a photodiode), to be converted from an optical signal into an electric current signal, and then passes through a trans-impedance amplifier (TIA) 210 for converting the converted current signal into an amplified signal in the form of a voltage.

The signal passing through the TIA 210 passes through a continuous time linear equalizer (CTLE) 211 for compensating for an attenuated response in a high frequency region and then passes through an analog-to-digital converter (ADC) 212 to be converted into a digital signal.

A received signal y(n) converted into a digital signal passes through an equalizer that compensates for interference caused by chromatic dispersion of the optical fiber 208 and for a nonlinear response in the direct-detection device 209 formed as the photodetector.

As the equalizer that compensates for the interference and the nonlinear response, a decision feedback equalizer (DFE) 213 or reduced state-maximum likelihood sequence equalizers (RS-MLSEs) 217 and 218 are used.

The signal passing through the equalizer that compensates for channel distortion passes through an inverse precoder 214, which reversely performs the functions of the precoder 203 in the transmission, and then passes through a PAM-4 constellation de-mapper 215 that converts a PAM-4 symbol signal into two bit signals. Thereafter, the transmitted signal is recovered by a channel error correction decoder 216 (i.e., an FEC decoder) for correcting residual errors in the converted bit signals.

There are the following problems in the above-described configuration of the related art.

Hard decision (HD) is used to operate a DFE or an MLSE which is an adaptive equalizer for compensation for a distorted received signal. When channel error correction for HD is used for a hard-decided symbol, the HD has a problem in that a coding gain is lowered by a range of 1 to 2 dB compared to soft decision.

Therefore, when channel error correction (i.e., the FEC) capable of soft-decision processing is used for a received symbol which is equalized using an equalizer capable of soft decision, the error correction may also be performed with respect to a lower uncoded bit error rate (BER) (a BER of the equalized output symbol), and thus the transmission distance may be further expanded than that in the related art.

Figure 3A:
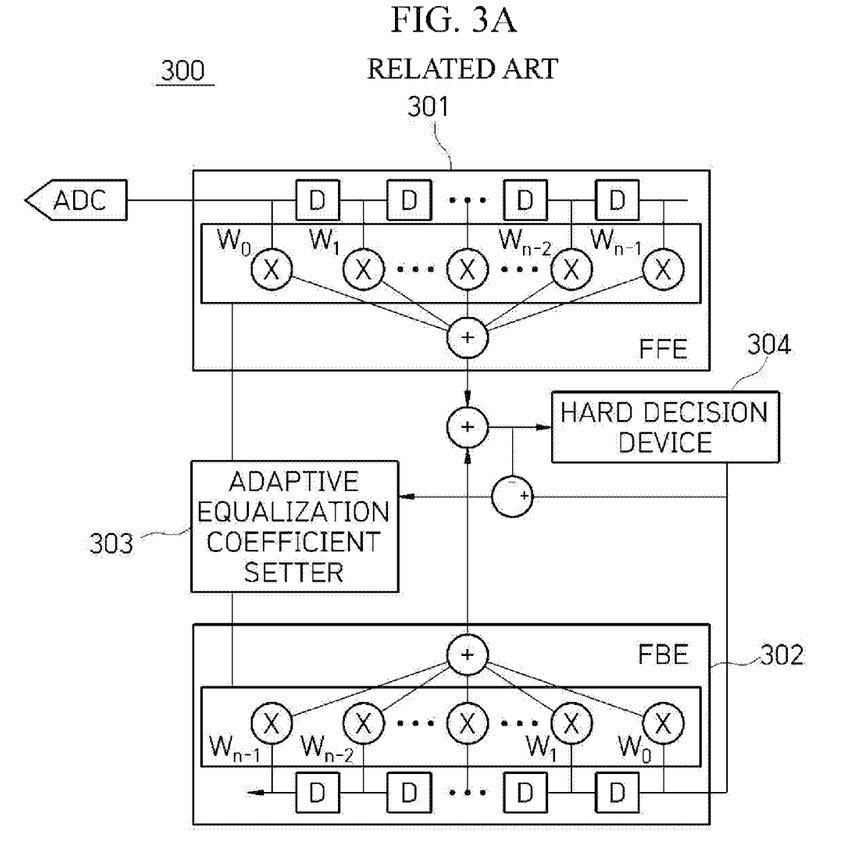
FIG. 3A is a diagram for describing a structure of a conventional decision feedback equalizer (DFE)

FIG. 3A is a diagram for describing a structure of a conventional DFE 300.

The DFE 300 includes a feed-forward equalizer (FFE) 301 which eliminates ISI between symbols by linearly combining signals, $y_n = \{\hat{x}\hat{x}\hat{x}(n), \hat{x}(n-1), \ldots, \hat{x}(n-N_b)\}$, which are input after a current hard-decided signal $\hat{x}(n)$, a feed-back equalizer (FBE) 302 which serves to linearly combine $\hat{x}_n = \{\hat{x}(n), \hat{x}(n-1), \ldots, \hat{x}(n-N_b)\}$ to eliminate interference by the previous symbol, and an adaptive equalization coefficient setter (tab adaptation) 303 which sets coefficients $w_i = \{w_a, w_b\}$ of the equalizers used as the FFE 301 and the FBE 302 to eliminate interference between symbols. Here, $w_a = \{w_a(0), w_a(1), \ldots, w_a(N_a-1)\}$ denotes the coefficient of the FFE 301 and $w_b = \{w_b(0), w_b(1), \ldots, w_b(N_b-1)\}$ denotes the coefficient of the FBE 302.

An HD device 304 sets the adaptive equalization coefficients using a least mean squares (LMS) algorithm among stochastic gradient algorithms for minimizing a difference $e(n)$ between an input $y_n \cdot w_a$ and an output % n as a method of setting an adaptive equalization coefficient.

The adaptive equalization coefficients are obtained by approximating a stochastic characteristic value for setting a tab coefficient, that is, Rxy, which is a cross-covariance between an input signal y and a transmitted signal x, and a covariance Ry for the input signal to a regression vector $y_n = \{y(n), y(n-1), \ldots, y(n-M)\}$ of the input signal y and an instantaneous value of the transmitted signal x.

Here, the regression vector represents M previous values of y(n). That is, by being approximated to $R_{xy} = x(i) \cdot y_n^*$, $Ry = y_n^* \cdot y_n$, the tab coefficient is approximated as shown in Equations 1 and 2 below.

$$w_i = w_{i-1} + \mu[R_{xy} - R_y w_{i-1}]$$ [Equation 1]

$$w_i = w_{i-1} + \mu y_n^*[x(i) - y_n w_{i-1}] = w_{i-1} + \mu y_n^* e(n)$$ [Equation 2]

Here, μ denotes a step size.

The structure of the DFE 300 according to FIG. 3A is a process of minimizing errors e(n) by approximating using an LMS algorithm and has disadvantages in that a convergence rate is low and a value of a mean squared error E[e2(n)] is larger than that in Equation 1.

Further, in the LMS algorithm, input signals independent of each other have good performance, but a received signal passing through an optical path is correlated with a signal adjacent thereto, thereby lowering the convergence rate of the LMS algorithm. Accordingly, there is a limitation in compensating for the distortion of the optical signal, and thus there is a limitation in expanding the transmission distance.

Figure 3B:
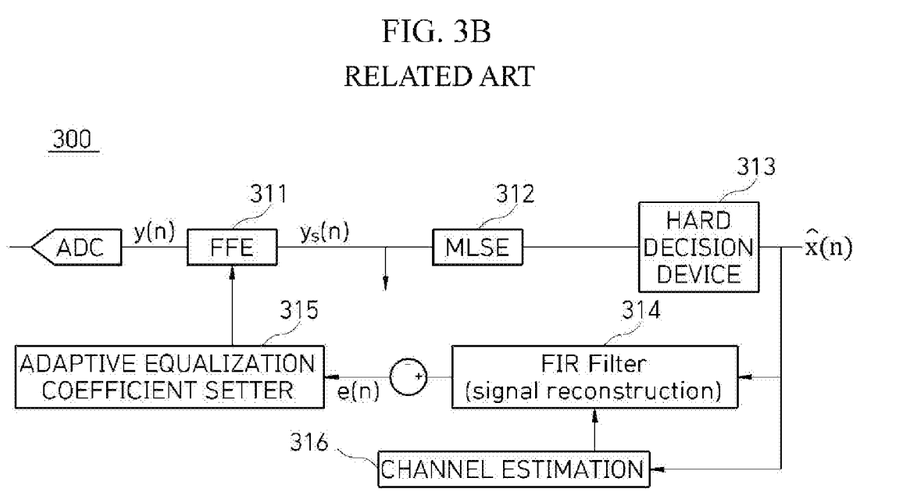
FIG. 3B is a diagram for describing a structure of a conventional maximum likelihood sequence equalizer (MLSE)

FIG. 3B is a diagram for describing a structure of a conventional MLSE 310.

The MLSE 310 determines values of symbols which are input based on a maximum likelihood in a sequence of received symbols.

When ISI (heavily ISI) is severe, the MLSE 310 has excellent performance in eliminating the ISI but has increased complexity. In this case, a complexity CMX is a function of a length of ISI to be eliminated, that is, a channel length $N_{ch}$, and a modulation order p of a transmitted symbol, and the complexity CMX is proportional to $\rho^{(Nch+1)}$ and exponentially increased with the channel length.

A complexity of a PAM-4 signal is increased with a multiplier 4 and increased more than that of a binary value. Therefore, in order to improve the complexity, an RS-MLSE 310 is used as illustrated in FIG. 3B.

First, ISI is reduced by an FFE 311 such that a length of a channel viewed by an MLSE 312 with respect to an input signal y(n) is reduced, and then the remaining ISI is equalized by the MLSE 312. Therefore, a length of an equivalent channel of an input signal $y_s(n)$ viewed by the MLSE 312 is reduced, and thus complexity is lowered.

However, in order to reduce the length of the channel, an adaptive equalization coefficient for adjusting a response of the FFE should be set by an adaptive equalization coefficient setter 315 such that a symbol x̂(n) determined by an HD device 313 through an output ys(n) of the FFE 311 and an output of the MLSE 312 passes through a FIR filter 314, and the symbol x̂(n) almost coincides with a synthesized signal ŷ$_n$ and a length of an equivalent channel viewed by the MLSE is reduced. That is, the coefficient of the FFE is adjusted such that an equation $E(|e(n)|^2) = |y_s(n) - \hat{y}_s(n)|^2$ is minimized.

To this end, channel estimation 316 is performed using the input signal y(n) and an HD output signal x̂(n) of the MLSE.

In such a structure, when the channel estimation is performed and a FIR filter signal for reconstruction of the signal is generated through the estimated channel, an HD signal is used. When the HD signal is used for error correction (i.e., FEC), FEC having excellent error correction capability, such as low-density parity-check (LDPC) may not be used. Further, in the existing MLSE, in order to estimate the channel and reconstruct the signal, a process of feeding back the HD output signal x̂(n) of the MLSE to the input path portion is necessary.

The above method has two major problems. First, when the output signal x̂(n) of the MLSE is incorrectly determined, the output signal x̂(n) is fed back and an error is propagated in a subsequent process. Second, when a soft-decision MLSE is used in the existing invention structure, a probability distribution for a sequence of determined symbols is required in channel estimation for the MLSE. In the case of the soft-decision, a probability distribution cannot be obtained because a reliability value of the symbol is transmitted instead of a determined value being provided.

Further, the existing MLSE has a problem in that, in channel estimation, signal reconstruction, and adaptive coefficient estimation, it is not easy to implement a high-speed operation requiring tens to hundreds of Gbps of processing due to a feedback operation.

As described above, in the related art, in order to expand the transmission distance in the optical communication method based on IM-DD, it is necessary to eliminate a signal distortion effect due to chromatic dispersion and nonlinearity of the photodetector. However, in the transmission and reception method using the existing equalizer or the MLSE, the distortion is compensated for by utilizing the HD signal of the received signal. The compensation has a limitation in additionally expanding the transmission distance by limiting a gain in subsequent error correction.

In an embodiment of the present invention, in order to address the above-described problems, a transmission structure and method are proposed, and thus an effect of expanding a transmission distance in optical communication using a method based on IM-DD may be obtained.

Hereinafter, an optical transmission apparatus 500 for processing a signal based on direct detection according to an embodiment of the present invention will be described with reference to FIGS. 4 to 6.

Figure 4:
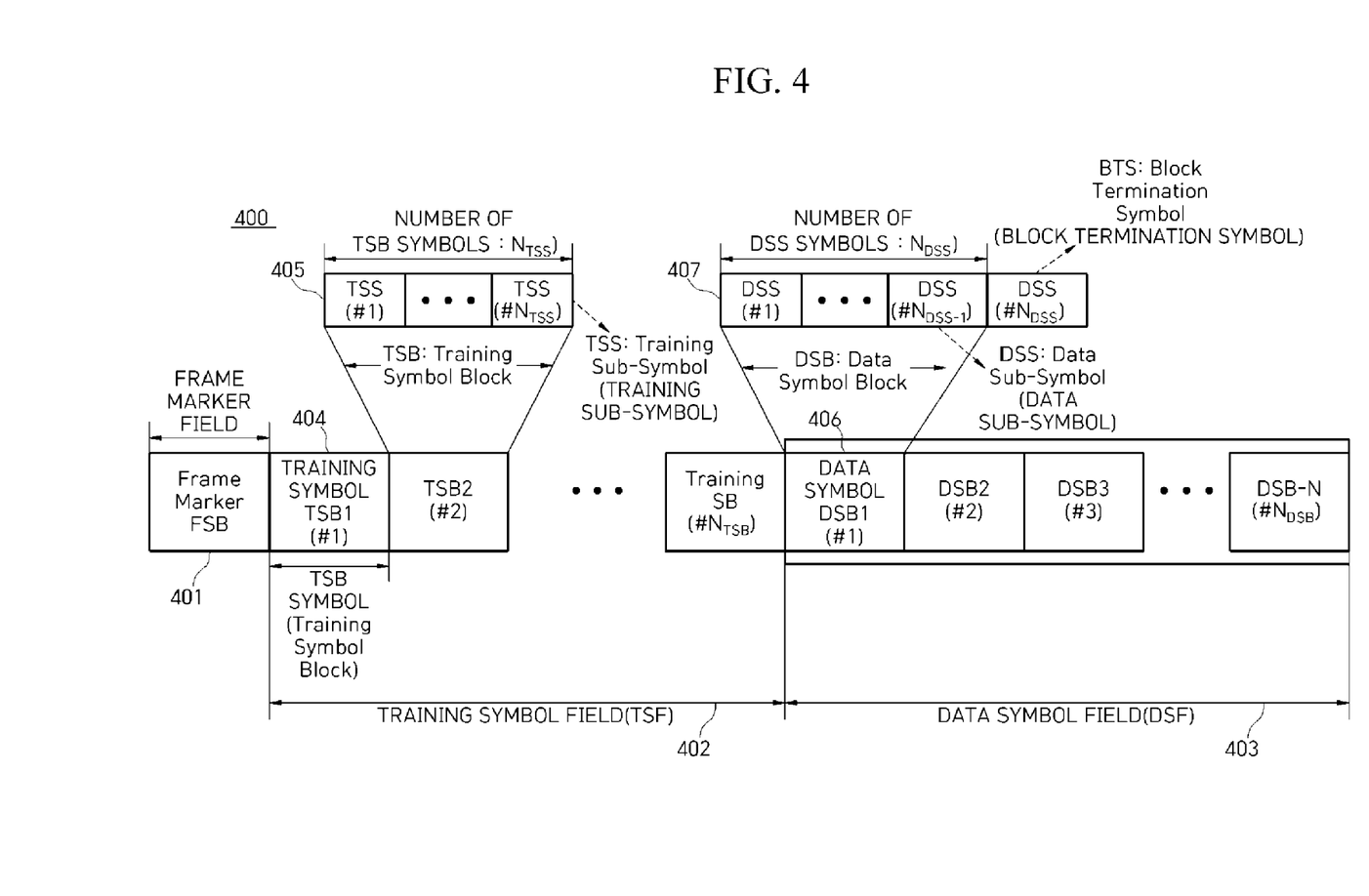
FIG. 4 is a diagram for describing a structure of transmission data applied to an embodiment of the present invention.

FIG. 4 is a diagram for describing a structure of transmission data 400 applied to the embodiment of the present invention. FIG. 5 is a block diagram of the optical transmission apparatus 500 for processing a signal based on direct detection according to the embodiment of the present invention.

Referring to FIG. 4, the structure of the transmission data 400 for obtaining the effects proposed by the present invention is mainly divided into three parts, and specifically, includes a frame marker field (FMF) 401, a training symbol field (TSF) 402, and a data symbol field (DSF) 403.

The FMF 401 is a field indicating a start of a received signal, the TSF 402 is a section in which an adaptive equalizer is trained to compensate for a channel and non-linear distortion of the received signal, and the DSF 403 is a section in which actual data transmission is performed.

In one embodiment, the FMF 401 may be designed to have 16 large symbols having the same value as +3 and 16 PAM-4 symbols having the same value as −3 in order to increase a reception probability of the received signal.

For example, the FMF 401 may have symbols {+3, +3, +3, +3, +3, +3, +3, +3, +3, +3, +3, +3, +3, +3, +3, −3, −3, −3, −3, −3, −3, −3, −3, −3, −3, −3, −3, −3, −3, −3, −3}. In this case, a repetition time may vary depending on a transmission rate and the longest transmission distance.

The TSF 402 may include a plurality of training symbol blocks (TSBs) 404 and may be repeatedly transmitted. The training symbol block 404 may include a plurality of training sub-symbols (TSSs) 405 obtained by mapping a pseudo random binary sequence (PRBS) or binary data of a random form to a PAM-4 symbol.

During the TSF 402, the equalizer sets tab coefficients of an FFE and an FBE of a DFE, which is proposed to eliminate interference of the received signal, and estimates a channel for a soft-decision MLSE.

The DSF 403 includes $N_{DSB}$ data symbol blocks (DSBs) 406. The DSB 406 includes $N_{DSS+1}$ symbols 407, and specifically, includes $N_{DSS}$ data sub-symbols (DSSs) and one block termination symbol (BTS).

The DSS may make an end state of a soft output MLSE be in a known state so that it is easy to start a traceback process.

During the DSF 403, based on the determined tab coefficient of the FFE and the estimated value of the channel, the soft output MLSE operates to compensate for the distortion of the received signal and calculate a log-likelihood ratio for the compensated signal, and the received signal passing through a de-interleaver to prevent a burst error is recovered by performing the error correction.

Figure 5:
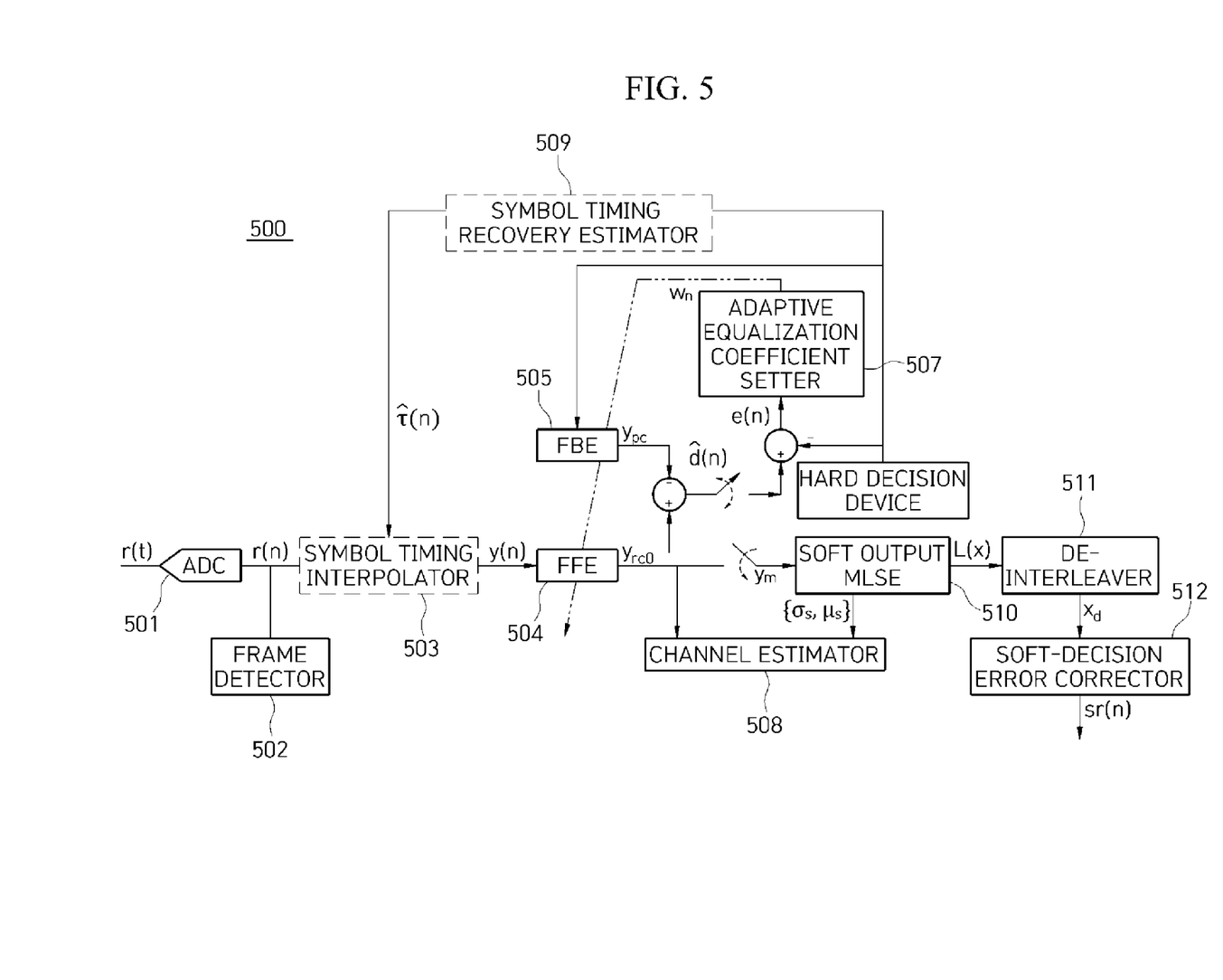
FIG. 5 is a block diagram of an optical transmission apparatus for processing a signal based on direct detection according to an embodiment of the present invention.

Referring to FIG. 5, in the optical transmission apparatus 500 for processing a signal based on direct detection according to the embodiment of the present invention, first, an ADC 501 quantizes a received signal r(t).

Next, a frame detector 502 detects a start of a frame, that is, a FMF, with respect to a signal si passing through the ADC 501.

Further, the frame detector 502 may detect the FMF by performing cross-correlation on the received signal with a frame marker signal, and the FMF may be represented by $C_{FM}$ in Equation 3.

$$C_{FM}(n) = \sum_{l=0}^{L_{FM}} C_l \cdot r(n+l) \quad \text{[Equation 3]}$$

In Equation 3, $C_1$ includes $\{C_0, C_1, C_2, \ldots, C_3\} = \{-3, -3, -3, \ldots, -3, +3, +3, +3, \ldots, +3\}$ in the reverse order of the frame marker pattern.

A point, at which a peak value according to a result after performing the cross-correlation according to Equation 3 above appears, becomes a point at which the FMF is present.

After the FMF detects the start of the frame, a symbol timing interpolator 503 performs interpolation on the received signal on the basis of a received PAM-4 symbol estimated by a symbol timing recovery estimator (STRE) 509. In this case, the symbol timing interpolator 503 interpolates a symbol value for a point at which an eye of the PAM-4 symbol opens the most.

Next, during a TSF section, an equalization process performed by the equalizer and a channel estimation process are performed on a signal y(n) with an interpolated symbol timing.

In this case, the equalization process performed by the equalizer is performed by an FFE 504, an FBE 505, an HD device 506, and an adaptive equalization coefficient setter 507.

Specifically, in one embodiment of the present invention, in the equalization process, in order to address the problem in the existing equalization process in which the process of adapting using the instantaneous value of the input signal according to Equations 1 and 2 as an approximation of the covariance is used, the covariance is approximated by utilizing K regression vectors and K training symbols of the interpolated signal so as to increase the approximation accuracy of the covariance.

In this case, for a sample order n of times which is input at each instance, the K regression vectors are represented by $\{y_n, y_{n-1}, \ldots, y_{n-K+1}\}$, and the K training symbols are represented by $d_n = \{d(n), d(n-1), \ldots, d(n-K+1)\}$.

Here, the regression vector $y_n$ includes M y sample values at n points and is a value storing values $y_n = \{y(n), y(n-1), \ldots, y(n-M+1)\}$.

Covariance $R_{yd}$ and covariance $R_y$ required for the equalization process may be approximated as shown in Equation 4 below.

$$R_y(n) = \frac{1}{K}\sum_{i=n-K+1}^{n} y_i y_i^*, \; R_{yd}(n) = \frac{1}{K}\sum_{i=n-K+1}^{n} d(i) y_i^* \quad \text{[Equation 4]}$$

In Equation 4, $y_i^*$ denotes Hermitian transpose or conjugate transpose.

Equation 4 may be expressed in a matrix form as shown in Equation 5.

$$R_y = \frac{1}{K} Y_n^* \cdot Y_n, \; R_{yd} = \frac{1}{K} Y_n^* \cdot d_n \quad \text{[Equation 5]}$$

In Equation 5, $Y_n = [y_n, y_{n-1}, \ldots, y_{n-K+1}]$ is expressed in a matrix of K×M.

When Equation 5 is applied to the adaptive equalization coefficient setter 507 necessary for the equalization process, an adaptive equalization coefficient $w_n$ is determined as shown in Equation 6.

$$w_n = w_{n-1} + \mu Y_n^*[d_n - Y_n w_{n-1}] = w_{n-1} + \mu Y_n^* e_n \quad \text{[Equation 6]}$$

In Equation 6, the adaptive equalization coefficient $w_n = \{w_{nf}, w_{nb}\}$ is obtained. In this case, $W_{nf}$ denotes an equalization coefficient of the FFE 504 and $W_{nb}$ denotes an equalization coefficient of the FBE 505.

Meanwhile, in Equation 6, when the coefficient W of the equalizer is updated at each sample instance, the complexity is increased. However, in one embodiment of the present invention, since the channel is a substantially fixed channel, not a rapidly changing channel, such as a wireless channel, in optical communication, the equalization coefficient W may be updated by the number of regression vectors.

Further, when the regression vectors $y_n$ and $d_n$ are constructed in a period of D at regular intervals, the complexity may be further reduced. When the regression vectors $y_n$ and $d_n$ are applied to the adaptive equalization coefficients, the equalization coefficient W may be expressed as Equation 7 below.

$$w_n = w_{n-1-K} + \mu Y_n^*[d_n - Y_n w_{n-1-K}] = w_{n-1-K} + \mu Y_n^* e_n \quad \text{[Equation 7]}$$

In this case, in Equation 7, $Y_n = [Y_n, Y_{n-D}, \ldots, Y_{n-(K-1)D}]$ and $d_n = [d(n), d(n-D), \ldots d(n-(K-1)D]$ are satisfied.

As described above, in one embodiment of the present invention, Equation 7 is applied to the equalization process for compensating for the interference and the nonlinear response of the received signal during the TSF section and a more sophisticated covariance compared to the related art is reflected, and thus the equalization performance of the equalizer can be improved.

The FFE 504 outputs a signal $y_{cr0}$, from which interference caused by a post-cursor of an optical transmission channel impulse response (CIR) is eliminated, using the equalization coefficient $W_{nf}$ of the FFE 504 determined by the adaptive equalization process during the TSF section.

The FBE 505 outputs a signal $y_{pc}$, from which the interference caused by the post-cursor of the optical transmission CIR is eliminated, using the equalization coefficient $W_n b$ of the FBE 505 determined by the adaptive equalization process during the TSF section.

In this case, a difference signal $\hat{d}_n$ between the output signals $y_{cr0}$ and $y_{pc}$ becomes a received signal including residual interference remaining after eliminating the interference caused by the CIR response.

A difference between the difference signal $\hat{d}_n$ and the training symbol d(n) becomes error signals e(n) of the received signal and a signal to be recovered.

The adaptive equalization coefficient setter 507 sets the coefficient of the equalizer such that a least squares error of the error signals is minimized through the process of Equation 7 above.

Meanwhile, during the TSF section, the channel estimator 508 performs channel estimation for an equalization process of a soft output MLSE 510.

Figure 6:
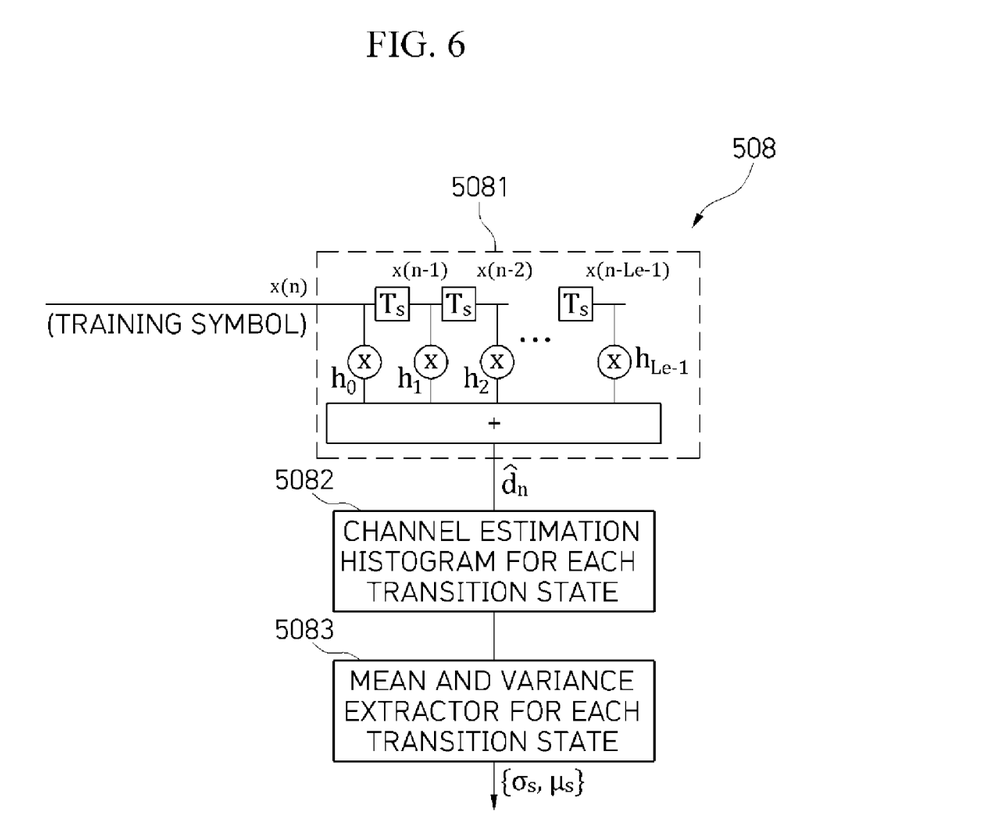
FIG. 6 is a diagram for describing a channel estimator according to an embodiment of the present invention.
Figure 7:
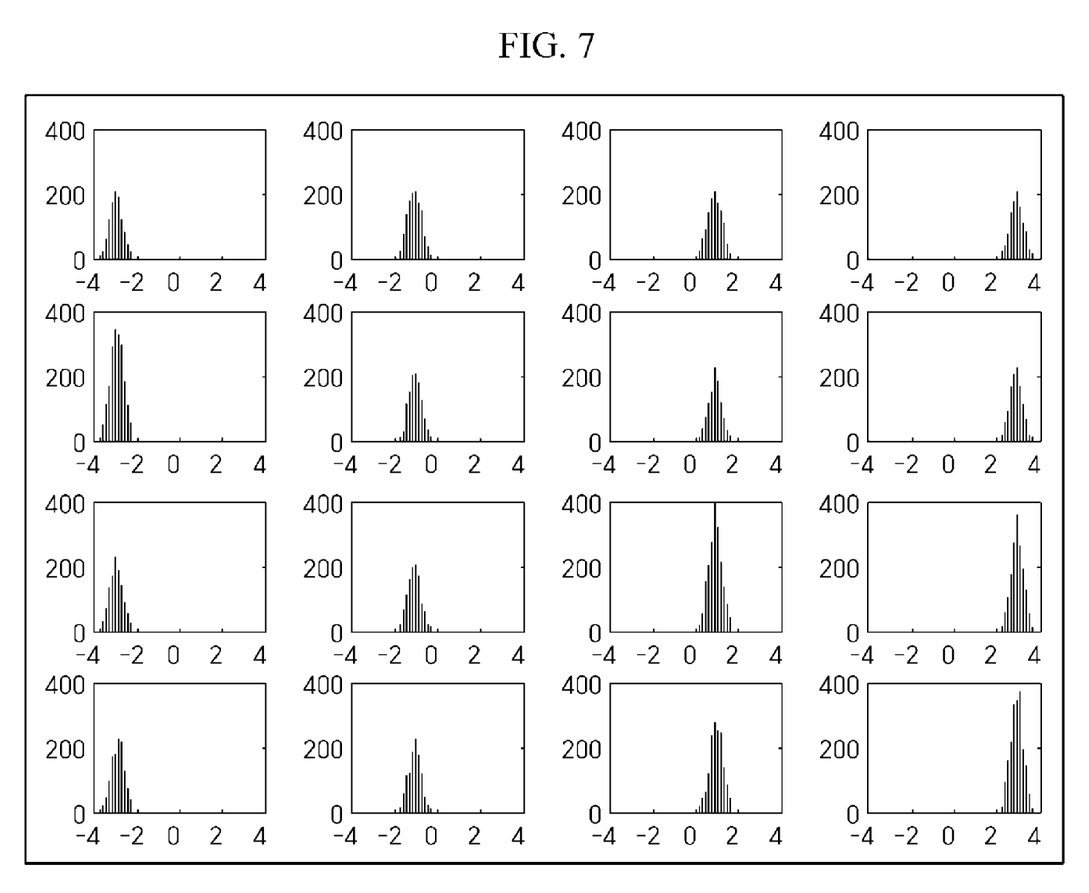
FIG. 7 illustrates examples of a state transition distribution for channel estimation.

FIG. 6 is a diagram for describing the channel estimator 508 according to the embodiment of the present invention. FIG. 7 illustrates examples of a state transition distribution for channel estimation.

In the channel estimation, a branch metric (BM) for obtaining a state transition probability according to an input signal $y_m$ (which is identical to d(n) during the TSF section) in the soft output MLSE 510 is required.

In order to calculate the state transition probability, the channel estimator 508 assumes an equivalent optical transmission channel 5081 formed to have a channel length $L_e$ reflecting the residual interference of the training symbol in the TSF. In this case, a state of the channel becomes a sequence of $\{x(n-1), x(n-2), \ldots, x(n-L_e-1)\}$ of the training symbol.

In this case, when an input signal x(n) is input, the state of the channel becomes a sequence of $\{x(n), x(n-1), \ldots, x(n-L_e-2)\}$, and in this case, an output signal becomes d(n).

Therefore, since the sequence of the training symbol d(n) is known in advance, state transition distributions may be obtained as illustrated in FIG. 7 by accumulating a histogram for the sequence, and a channel estimation histogram 5082 for each transition state plays the above role.

A mean and variance extractor 5083 for each transition state extracts a mean value $\mu_s$ and a standard deviation $\sigma_s$ from the channel estimation histogram 5082 for each transition state.

In one embodiment, FIG. 7 illustrates examples of a state transition distribution when a PAM-4 training symbol is input in the case in which a length Le of an equivalent channel is 1.

The equalization coefficients are set and the channel estimation is performed during the TSF section. Thereafter, an equalization process is performed to compensate for a residual optical channel response using the soft output MLSE 510 during a DSF section.

When the input signal $y_m$ is input, the soft output MLSE 510 transmits a log-likelihood ratio L(x) for informing of a probability of the input symbol x(n) to a de-interleaver 511.

The existing Bahl-Cocke-Jelinek-Raviv (BCJR) algorithm or soft output Viterbi algorithm (SOVA) is applied to the above process. That is, when the soft output MLSE 510 calculates a BM using the BCJR algorithm or SOVA, the following Equation 8 may be applied to the BM using the mean value $\mu_s$ and the standard deviation as extracted by the channel estimator 508 described above.

$$BM(i, j, y_m) = (y_m - \mu_{i,j})^2 \frac{1}{\sigma_{i,j}^2} \quad \text{[Equation 8]}$$

In Equation 8, "i, j" denotes a transition from a state i to a state j.

Thereafter, an output L(x) of the soft output MLSE 510 passes through the de-interleaver 511. The de-interleaver 511 transmits a signal $x_d$ passing through the de-interleaver 511 to a soft-decision error corrector 512 capable of soft-decision processing in a reverse process of an interleaver used to prevent a burst error due to the optical transmission channel response.

The soft-decision error corrector 512 recovers the received signal by performing error correction on the received signal in which the distortion is compensated for. The soft-decision error corrector 512 may have better error correction capability than a HD error corrector (e.g., Reed-Solomon codes), which is mainly used in the related art, thereby lowering a BER at the same signal-to-noise ratio.

That is, in the embodiment of the present invention, there is an advantage in that the transmission distance may be expanded more than when using the existing HD error corrector.

Meanwhile, the optical transmission apparatus 500 for processing a signal based on direct detection may include a memory (not illustrated) in which programs for performing the functions in FIGS. 5 to 6 are stored and a processor (not illustrated) for executing the programs stored in the memory. In this case, the memory is generally referred to as a non-volatile storage device which maintains stored information even when power is not supplied, and a volatile storage device.

For example, the memory may include a NAND flash memory, such as a compact flash (CF) card, a secure digital (SD) card, a memory stick, a solid-state drive (SSD), a micro SD card, or the like, a magnetic computer storage such as a hard disk drive (HDD), or the like, and an optical disc drive, such as a compact disc read only memory (CD-ROM), a digital video disc read only memory (DVD-ROM), or the like.

For reference, the components illustrated in FIGS. 5 and 6 according to the embodiment of the present invention may be implemented in software or in hardware form such as a field-programmable gate array (FPGA) or an Application-Specific Integrated Circuit (ASIC) and may perform certain functions.

However, the components are not limited to software or hardware. Each component may be included in a recording medium that may address the component or may be formed to be executed by at least one processor.

Therefore, examples of the components may include components such as software components, object-oriented software components, class components, and task components, processes, functions, attributes, procedures, subroutines, segments in program codes, drivers, firmware, microcode, circuits, data, databases, data structures, tables, arrays, and parameters.

Components and functions provided from corresponding components may be combined into a smaller number of components or may be further separated into additional components.

Hereinafter, a method performed on the optical transmission apparatus 500 for processing a signal based on direct detection according to the embodiment of the present invention will be described with reference to FIG. 8.

Figure 8:
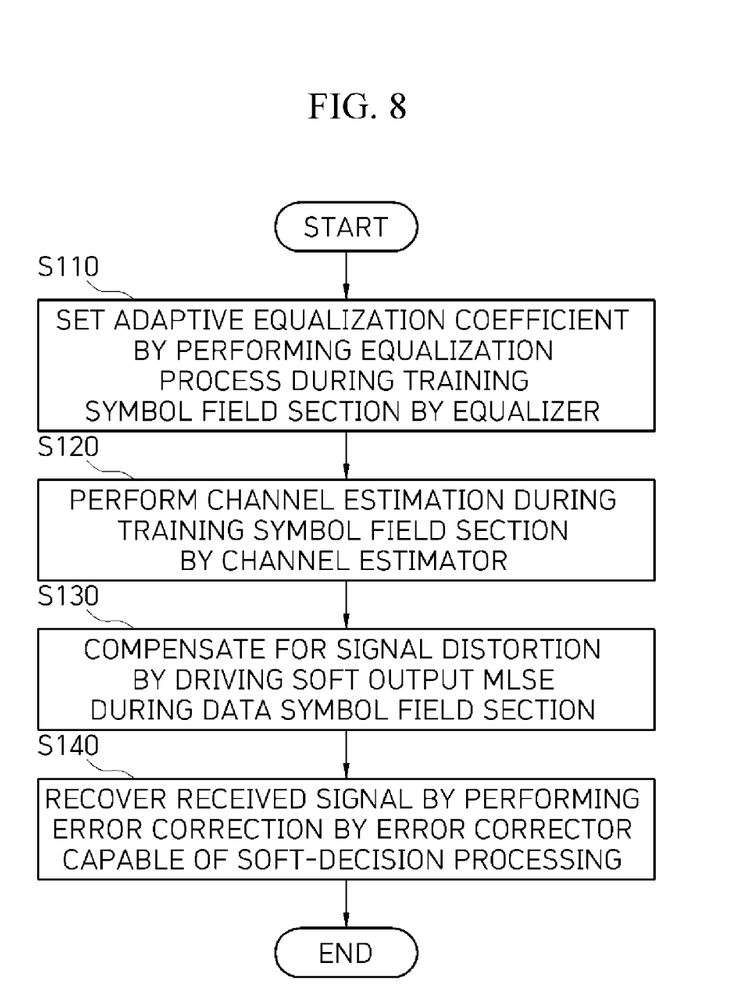
FIG. 8 is a flowchart of an optical transmission method for processing a signal based on direct detection according to an embodiment of the present invention.

FIG. 8 is a flowchart of an optical transmission method for processing a signal based on direct detection according to an embodiment of the present invention.

In the optical transmission method for processing a signal based on direct detection according to the embodiment of the present invention, first, an equalizer performs an equalization process during a TSF section in a frame for a received signal so that an adaptive equalization coefficient is set (S110).

Next, a channel estimator performs channel estimation to perform an equalization process of a soft output MLSE during the TSF section (S120).

Next, during a DSF section in the frame, distortion of the received signal is compensated for by driving the soft output MLSE on the basis of the adaptive equalization coefficient and an estimated result value of a channel (S130), and an error corrector capable of soft-decision processing for the received signal in which the distortion is compensated for performs error correction so that the received signal is recovered (S140).

Meanwhile, operations S110 to S140 in the above description may be further divided into additional operations or be combined into fewer operations in some embodiments of the present invention. Further, some operations may be omitted if necessary, and the order of the operations may be changed. In addition, even if other contents are omitted, the contents already described in FIGS. 5 to 7 may be applied to the optical transmission method of processing a signal based on direct detection of FIG. 8.

Meanwhile, the embodiment of the present invention may also be realized in the form of a computer program stored in a medium and executed by a computer or a recording medium including instructions executable by the computer. Computer readable media may be any available media which may be accessed by the computer and may include all of volatile and non-volatile media and separable and non-separable media. The computer readable media may also include both computer storage media and communication media. The computer storage media may include any of volatile and non-volatile media and separable and non-separable media, which are implemented using any method or technology for the storage of information such as computer readable instructions, data structures, program modules, or other pieces of data. The communication media typically include computer readable instructions, data structures, program modules, other pieces of data in a modulated data signal such as a carrier wave, or other transport mechanisms, and include arbitrary information delivery media.

Although the methods and systems of the present invention have been described in connection with specific embodiments, some or all of their components or operations may be implemented using a computer system having a general purpose hardware architecture.

According to any one of the above-described solutions of the present invention, in operating a DFE or an MLSE, which is an adaptive equalizer for compensating for a distorted received signal, by utilizing a structure and method capable of soft decision rather than the existing invention using HD, error correction can be performed with respect to a lower uncoded BER (a BER of the equalized output symbol), and thus the transmission distance can be further expanded than that in the related art.

Further, according to the embodiment of the present invention, during a TSF section in which a feedback structure for channel estimation and signal reconstruction in an MLSE structure used in the related art is not used, a feed-forward structure can be provided so that channel estimation is performed in an adaptive equalization process, and thus an error propagation problem occurring in the related art can be addressed.

Further, a probability distribution for a sequence of determined symbols is required in channel estimation for the MLSE. In the case of the soft-decision, a probability distribution cannot be obtained because a reliability value of the symbol is transmitted instead of providing a determined value. Therefore, the problem of not being able to utilize the soft-decision MLSE can be addressed.

In addition, by making approximation of covariance more sophisticated in the adaptive equalization process during the TSF section as compared to the related art, errors generated after equalization convergence can be reduced. That is, unlike the related art in which one regression vector that uses an instantaneous value is used in approximation of covariance, approximation of covariance can be sophisticated by utilizing K regression vectors and thus channel estimation can be performed more accurately.

The above description of the present invention is only exemplary, and it will be understood by those skilled in the art that various modifications can be made without departing from the technical scope of the present invention and without changing essential features. Therefore, the above-described embodiments should be considered in a descriptive sense only and not for purposes of limitation. For example, each component described as a single type may be realized in a distributed manner, and similarly, components that are described as being distributed may be realized in a coupled manner.

The above-described embodiments should be considered in a descriptive sense only and not for purposes of limitation. Accordingly, the scope of the invention is not limited by the embodiments. The scope of the invention is defined by the appended claims and encompasses all modifications and equivalents that fall within the scope of the appended claims.

What is claimed is:

1. An optical transmission apparatus for processing a signal based on direct detection, the optical transmission apparatus comprising:
    an equalizer configured to perform an equalization process during a training symbol field section of a received signal and set an adaptive equalization coefficient;
    a channel estimator configured to estimate a channel during the training symbol field section;
    a soft output maximum likelihood sequence equalizer (MLSE) configured to compensate for distortion of the received signal during a data symbol field section of the received signal on the basis of the adaptive equalization coefficient and an estimated result value of the channel; and
    a soft-decision error corrector configured to recover the received signal by performing error correction on the received signal in which the distortion is compensated for.

2. The optical transmission apparatus of claim 1, wherein a frame of the received signal includes:
    a frame marker field indicating a start of the received signal;
    a training symbol field that is a section in which an adaptive equalizer is trained to compensate for a channel and nonlinear distortion of the received signal; and
    a data symbol field in which actual data transmission is performed.

3. The optical transmission apparatus of claim 2, wherein:
    the training symbol field includes a plurality of training symbol blocks; and
    the training symbol block includes a plurality of training sub-symbols obtained by mapping a pseudo random binary sequence (PRBS) or binary data of a random form to a four-level pulse-amplitude modulation (PAM-4) symbol.

4. The optical transmission apparatus of claim 2, wherein:
the data symbol field includes a plurality of data symbol blocks; and
the data symbol block includes a plurality of data sub-symbols and one block termination symbol.

5. The optical transmission apparatus of claim 1, further comprising:
an analog-to-digital convertor (ADC) configured to quantize the received signal; and
a frame detector configured to detect a frame marker field of a signal passing through the ADC.

6. The optical transmission apparatus of claim 5, wherein the frame detector detects the frame marker field by performing cross-correlation on the received signal with a frame marker signal.

7. The optical transmission apparatus of claim 5, further comprising a symbol timing interpolator configured to perform interpolation on the received signal on the basis of a received PAM-4 symbol estimated by a symbol timing recovery estimator.

8. The optical transmission apparatus of claim 7, further comprising an adaptive equalization coefficient setter configured to approximate a covariance on the basis of regression vectors and training symbols of the interpolated signal and to calculate the adaptive equalization coefficient on the basis of the approximated covariance.

9. The optical transmission apparatus of claim 8, wherein the regression vector of the interpolated signal includes M sample values of the interpolated signal.

10. The optical transmission apparatus of claim 8, wherein the adaptive equalization coefficient includes an equalization coefficient of a feed-forward equalizer (FFE) and an equalization coefficient of a feed-back equalizer (FBE).

11. The optical transmission apparatus of claim 10, wherein the adaptive equalization coefficient is updated by the number of K regression vectors of the interpolated signal.

12. The optical transmission apparatus of claim 10, wherein the K regression vectors and the K training symbols of the interpolated signal are generated at each preset period.

13. The optical transmission apparatus of claim 10, wherein:
the FFE outputs a signal from which interference caused by a post-cursor of an optical transmission channel impulse response is eliminated on the basis of the adaptive equalization coefficient determined by the equalization process; and
the FBE outputs a signal from which the interference caused by the post-cursor of the optical transmission channel impulse response is eliminated on the basis of the adaptive equalization coefficient determined by the equalization process; and
the adaptive equalization coefficient setter calculates an error signal using a difference signal between signals from which the interference is eliminated and using a difference between the difference signal and the training symbol and sets the adaptive equalization coefficient by reflecting the error signal on the adaptive equalization coefficient.

14. The optical transmission apparatus of claim 1, wherein the channel estimator assumes an equivalent optical transmission channel formed to have a channel length reflecting residual interference of the training symbol in the training symbol field, accumulates a histogram of the training symbol output through the equivalent optical transmission channel, and extracts a mean value and a standard deviation from the accumulated histograms.

15. The optical transmission apparatus of claim 14, wherein the soft output MLSE calculates a branch metric using the extracted mean value and standard deviation to calculate a log-likelihood ratio for an input symbol, and compensates for distortion.

16. The optical transmission apparatus of claim 15, wherein the soft-decision error corrector receives a signal passing through a de-interleaver for preventing a burst error and performs the error correction on the basis of the calculated log-likelihood ratio.

17. An optical transmission method for processing a signal based on direct detection, the optical transmission method comprising:
performing, by an equalizer, an equalization process during a training symbol field section in a frame of a received signal and setting an adaptive equalization coefficient;
performing, by a channel estimator, channel estimation to perform an equalization process of a soft output maximum likelihood sequence equalizer (MLSE) during the training symbol field section;
driving the soft output MLSE and compensating for, by the soft output MLSE, distortion of the received signal during a data symbol field section in the frame on the basis of the adaptive equalization coefficient and an estimated result value of a channel; and
performing, by an error corrector which allows soft-decision processing to be performed, error correction on the received signal in which the distortion is compensated for and recovering the received signal by.

18. The optical transmission method of claim 17, further comprising:
inputting the received signal to an analog-to-digital convertor (ADC) and quantizing the received signal;
passing a signal passing through the ADC through a frame detector and detecting a frame marker field; and
performing, by a symbol timing interpolator, interpolation on the received signal on the basis of a received four-level pulse-amplitude modulation (PAM-4) symbol estimated by a symbol timing recovery estimator,
wherein the passing of the signal passing through the ADC through the frame detector and the detecting of the frame marker field include performing cross-correlation on the received signal with a frame marker signal and detecting the frame marker field.

19. The optical transmission method of claim 18, wherein the performing of the equalization process during the training symbol field section in the frame of the received signal by the equalizer and the setting of the adaptive equalization coefficient include:
approximating a covariance on the basis of K regression vectors and K training symbols of the interpolated signal; and
applying the approximated covariance to an adaptive equalization coefficient setter and calculating the adaptive equalization coefficient, and
the adaptive equalization coefficient includes an equalization coefficient of a feed-forward equalizer (FFE) and an equalization coefficient of a feed-back equalizer (FBE).

20. The optical transmission method of claim 17, wherein the performing of the channel estimation in the channel estimator includes:

assuming an equivalent optical transmission channel formed to have a channel length reflecting residual interference of the training symbol in a training symbol field;

accumulating a histogram of the training symbol output through the equivalent optical transmission channel; and extracting a mean value and a standard deviation from the accumulated histograms, and the compensating for the distortion of the received signal includes calculating a branch metric using the extracted mean value and standard deviation to calculate a log-likelihood ratio for the input symbol and compensating for distortion.

* * * * *